United States Patent
Tsuda

(10) Patent No.: US 8,901,780 B2
(45) Date of Patent: Dec. 2, 2014

(54) IMAGE FORMING APPARATUS

(75) Inventor: Kenichi Tsuda, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 724 days.

(21) Appl. No.: 13/190,476

(22) Filed: Jul. 25, 2011

(65) Prior Publication Data

US 2012/0025630 A1   Feb. 2, 2012

Related U.S. Application Data

(60) Provisional application No. 61/368,627, filed on Jul. 28, 2010.

(51) Int. Cl.
| | |
|---|---|
| H01H 47/00 | (2006.01) |
| H02J 7/00 | (2006.01) |
| H02J 9/00 | (2006.01) |
| G03G 15/00 | (2006.01) |
| H02J 7/34 | (2006.01) |

(52) U.S. Cl.
CPC ............. *H02J 9/005* (2013.01); *H02J 7/345* (2013.01); *G03G 15/80* (2013.01); *G03G 15/5004* (2013.01)
USPC .......................................................... 307/125

(58) Field of Classification Search
USPC .......................................................... 307/125
See application file for complete search history.

(56) References Cited

FOREIGN PATENT DOCUMENTS

JP    4308562    8/2009

*Primary Examiner* — Hal Kaplan
(74) *Attorney, Agent, or Firm* — Patterson & Sheridan LLP

(57) ABSTRACT

There is provided an image forming apparatus including: a load device which performs a copy function, a scan function, a print function and the like; and a power saving mode such as a standby mode and a sleep mode. When the image forming apparatus is in the power saving mode, electric charge charged in an electric storage device such as an electrolytic capacitor which is a low voltage power source is used to execute the power saving mode. When an electric potential of the electric storage device is lower than a predetermined threshold, the electric storage device is charged by a commercial power source.

20 Claims, 5 Drawing Sheets

FIG. 5

| CAPACITANCE OF ELECTROLYTIC CAPACITOR ($\mu$F) | FULL CHARGING TIME (sec) | POWER CONSUMPTION AMOUNT DURING FULL CHARGING (Wh) |
|---|---|---|
| 2200 | 0.5 | 0.0067 |
| 4400 | 0.5 | 0.0102 |
| 6600 | 0.5 | 0.0136 | though they are not illustrated. The low voltage power source section 13 includes a rectifying circuit 15, an electric storage device 16, a DC-DC converter 17 and a relay 18.

IMAGE FORMING APPARATUS

CROSS-REFERENCE TO RELATED APPLICATION

This application is based upon and claims benefit of priority from U.S. Provisional Application No. 61/368,627 filed on Jul. 28, 2010, the entire contents of which are incorporated herein by reference.

FIELD

Embodiments described herein relate generally to an image forming apparatus which is intended to reduce power consumption.

BACKGROUND

In recent years, as interest in global warming and power saving increased, a variety of measures are proposed in a variety of fields. For example, in a field of office automation (OA) devices used in offices or homes, a variety of techniques have been developed in view of power saving.

In an image forming apparatus which includes a variety of functions such as a copy function, a scan function and a print function, a power saving mode such as a standby mode and a sleep mode is set in addition to a normal operation mode, to achieve power saving. In the normal operation mode of the image forming apparatus, for example, when reading an original document for printing, it is necessary that an electrostatic latent image on a photosensitive drum should be able to be rapidly transferred onto a recording paper, so as to complete printing without standby. Thus, a heater for heating and fixing toner should constantly maintain a heating state.

In a print mode, it is necessary to supply electric power in order to maintain a variety of operations such as electrical connection to a light source driving motor, a driving motor for transporting recording paper or the like, and the fixing heater. In the image forming apparatus including the variety of functions, the print mode is an operation mode in which load to a power source becomes the maximum.

The standby mode refers to an operation mode in which the image forming apparatus is in a standby state to be able to perform printing anytime. An operation of an electronic circuit approximately corresponds to the print mode, but in reality, the printing should not necessarily be performed. Thus, it is not necessary to operate the variety of motors or the heater. For this reason, in the standby mode, the motor driving may be turned off, or the electrical connection to the heater may be cut off, to significantly reduce the load to the power source compared with the print mode. When a print instruction is input from a control panel, an external personal computer or the like in the standby mode, the standby mode immediately shifts to the print mode to perform printing.

The sleep mode refers to an operation mode which is automatically transited from the standby mode when the standby mode is continued for a predetermined time, wherein the load to the power source becomes the minimum. Specifically, except power supply to the function of communicating with the control panel, the external personal computer or the like, power supply to sections which perform the other functions is entirely stopped. If the print instruction is input from the control panel or the external personal computer, a print instruction signal is recognized by a communicating section which is supplied with electric power. Then, the communicating section gives an instruction to supply electric power to a necessary electronic circuit, so that the operation mode returns to the standby mode and then shifts to the print mode.

BRIEF DESCRIPTION OF THE DRAWINGS

FIG. 5 is a diagram illustrating charging time and the amount of consumed power, which illustrates the operation according to the embodiment.

DETAILED DESCRIPTION

Figure 1:
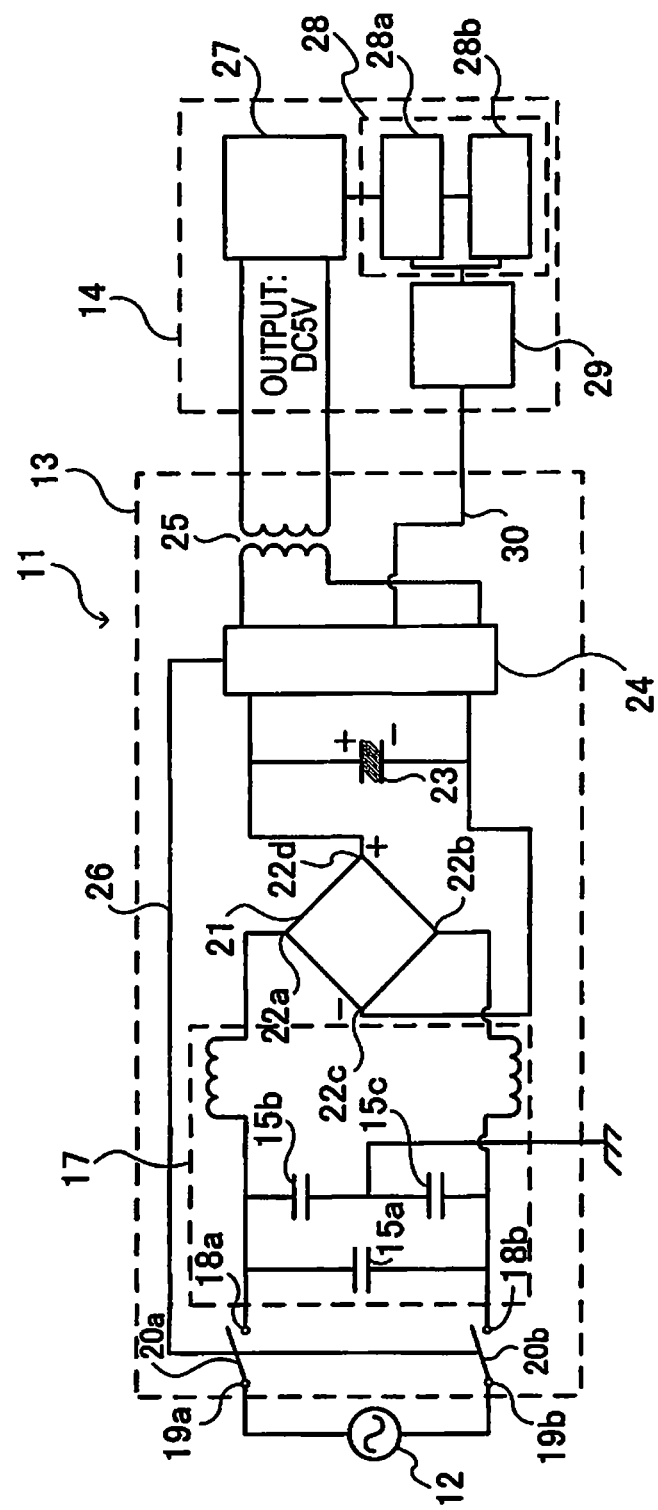
FIG. 1 is a circuit diagram illustrating a configuration of an image forming apparatus according to an embodiment.

Hereinbefore, the print mode of the image forming apparatus is described as an example. According to the above-described technique, the standby mode and the sleep mode are set in addition to the normal operation mode, thereby achieving significant power saving compared with the case of the normal operation mode only. In this regard, it is possible to improve the power source efficiency in the standby mode, the sleep mode or the like. However, in such a power saving mode, electric power should be supplied from a commercial power source to sections which should be constantly operated, which leads to a limit to reduction in power consumption.

According to an embodiment, there is provided an image forming apparatus which converts AC voltage from a commercial power source into DC voltage through a rectifying circuit and an electric storage device and supplies the DC voltage to a load through a transformer, wherein a relay is installed between the commercial power source and the rectifying circuit; the electric storage device is capable of charging and discharging, and an electric storage device residual potential monitoring circuit is connected to an output terminal of the electric storage device; the load includes a load device, a power saving mode control section, and a power saving mode shift detecting section which detects that the load shifts to a power saving mode and outputs a power saving mode shift signal; and if the power saving mode shift signal is input to the electric storage device residual potential monitoring circuit, a relay opening and closing signal for instructing opening and closing of the relay is output from the electric storage device residual potential monitoring circuit, the relay is opened to cut off the supply of the commercial power source, and electric charge charged in the electric storage device is supplied to the power saving mode control section.

Hereinafter, embodiments will be described with the accompanying drawings. An image forming apparatus in the description of each embodiment which will be described hereinafter includes functions such as a copy function, a scan function, and a print function. An image forming apparatus 11 in FIG. 1 roughly includes a low voltage power source section 13 which converts a commercial AC power source 12 which is an external power source into a low voltage DC power source, and a load 14 which is supplied with the drive power converted from the low voltage power source section 13. The load 14 includes a variety of element techniques for saving electric power supplied to all the functions, in addition to various devices which operate main functions such as a copy function, a scan function or a print function.

The low voltage power source section 13 of the image forming apparatus 11 includes a noise filter 17, a rectifying diode bridge 21, a smoothing electrolytic capacitor 23, an electrolytic capacitor residual potential monitoring circuit 24, and a transformer 25.

The noise filter 17 includes smoothing capacitors 15a, 15b and 15c. Further, input terminals 18a and 18b of the noise filter 17 and output terminals 19a and 19b of the commercial power source 12 are connected with each other through a pair of relays 20a and 20b. These relays 20a and 20b are set to be interlocked with each other for operation. That is, when the relays 20a and 20b are closed, electric power from the commercial power source 12 is supplied to the low voltage power source section 13, but when the relays are opened, electric power from the commercial power source 12 is not supplied to the low voltage power source section 13.

An output of the noise filter 17 is input to input terminals 22a and 22b of the rectifying diode bridge 21, and is output as a DC voltage through output terminals 22c and 22d. The output from the rectifying diode bridge 21 is applied to the smoothing electrolytic capacitor 23. It is preferable that an aluminum electrolytic capacitor be used as the smoothing electrolytic capacitor 23. The electrolytic capacitor residual potential monitoring circuit 24 is connected to opposite terminals of the smoothing electrolytic capacitor 23. A shunt regulator or the like is provided as the electrolytic capacitor residual potential monitoring circuit 24.

The example in FIG. 1 illustrates a specific example of the smoothing electrolytic capacitor 23, but a different device may be employed as long as the device is an electric storage device capable of charging and discharging. For example, an electric double layer capacitor maybe employed. Accordingly, the electrolytic capacitor residual potential monitoring circuit 24 is illustrated in FIG. 1, but only has to have a function and a configuration as an electric storage device residual potential monitoring circuit, in a broad sense.

The load 14 is provided with a load device 27, a power saving mode control section 28 which is connected to the load device 27, and a power saving mode shift detecting section 29 which is connected to the power saving mode control section 28. The power saving mode control section 28 is provided with a standby mode control section 28a and a sleep mode control section 28b. An output signal from each of the standby mode control section 28a and the sleep mode control section 28b is input to the power saving mode shift detecting section 29.

A relay opening and closing signal 26 input to an opening and closing control mechanism (not shown) of the relays 20a and 20b is output from the electrolytic capacitor residual potential monitoring circuit 24. The relays 20a and 20b are opened and closed in response to the relay opening and closing signal 26. As described above, when the relays 20a and 20b are closed, electric power from the commercial power source 12 is supplied to the low voltage power source section 13, but when the relays 20a and 20b are opened, electric power from the commercial power source 12 is not supplied to the low voltage power source section 13.

Further, a power saving mode shift signal 30 which is an output signal of the power saving mode shift detecting section 29 of the load 14 is input to the electrolytic capacitor residual potential monitoring circuit 24. When the load 14 is in the power saving mode, that is, when the standby mode control section 28a or the sleep mode control section 28b of the power saving mode control section 28 is in an operation state, the power saving mode shift signal 30 is output from the power saving mode shift detecting section 29. In this way, only when the load 14 of the image forming apparatus 11 is in the power saving mode, the power saving mode shift signal 30 is input to the electrolytic capacitor residual potential monitoring circuit 24.

When the load 14 is neither in the standby mode control section 28a nor the sleep mode control section 28b and the load device 27 is being operated in which the copy function or the print function is in an operation state, the power saving mode shift signal 30 which is the output signal from the power saving mode shift detecting section 29 of the load 14 is not output from the power saving mode control section 28. Accordingly, the power saving mode shift signal 30 is not input to the electrolytic capacitor residual potential monitoring circuit 24.

The function and operation example of the electrolytic capacitor residual potential monitoring circuit 24 will be described with reference to FIGS. 1 and 2. The electrolytic capacitor residual potential monitoring circuit 24 has a function of setting and retaining a reference potential which becomes a threshold A, and a function of comparing the threshold A with a residual potential B of the smoothing electrolytic capacitor 23. Further, if the residual potential B≥the threshold A and the power saving mode shift signal 30 from the power saving mode shift detecting section 29 of the load 14 is input to the electrolytic capacitor residual potential monitoring circuit 24, the electrolytic capacitor residual potential monitoring circuit 24 outputs the relay opening and closing signal 26 to open the relays 20a and 20b.

Figure 2:
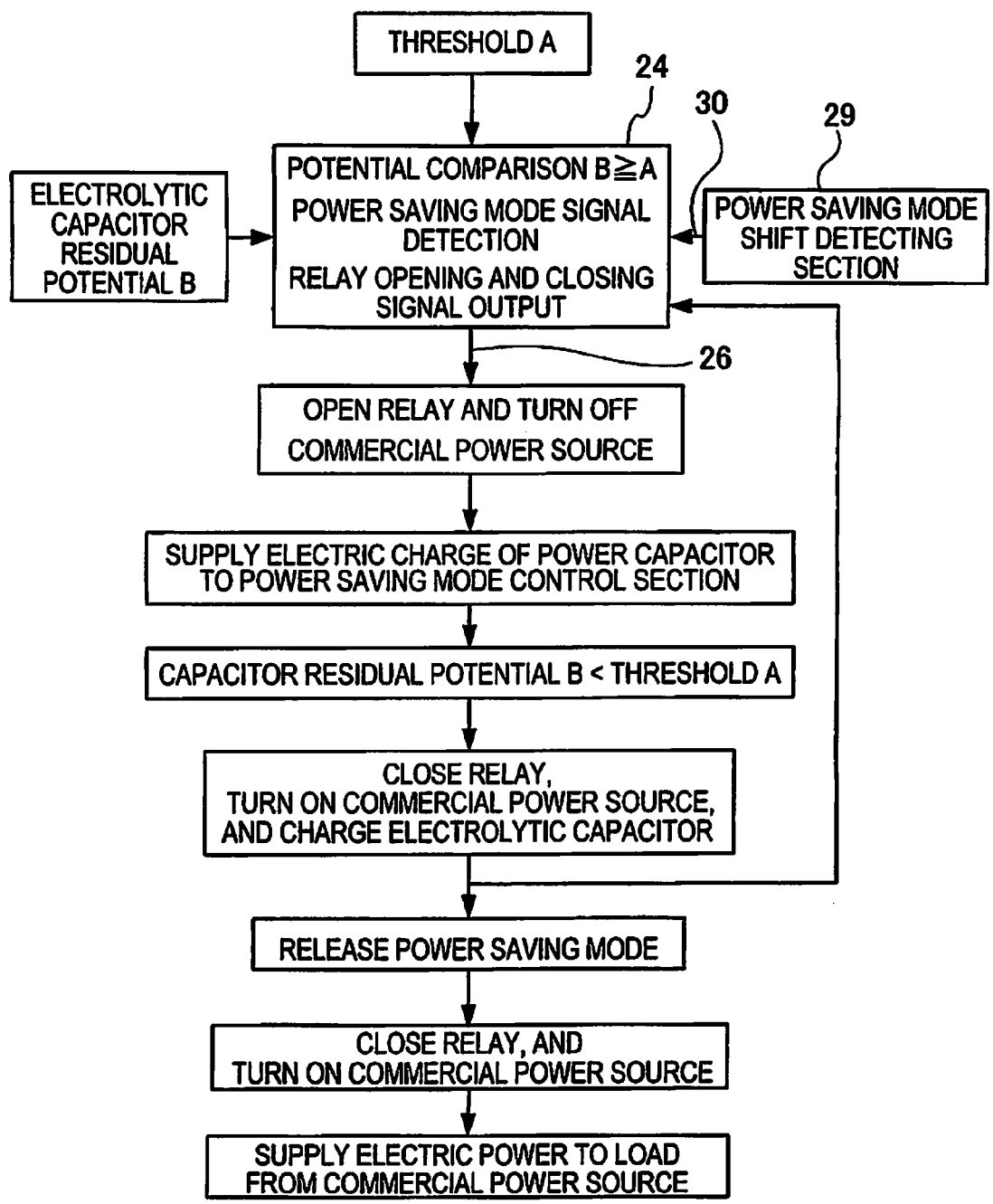
FIG. 2 is a flowchart illustrating an operation according to the embodiment.

That is, as shown in FIG. 2, if the electrolytic capacitor residual potential B≥the threshold A and the power saving mode shift signal 30 is input, the electrolytic capacitor residual potential monitoring circuit 24 outputs the relay opening and closing signal 26 to open the relays 20a and 20b. Consequently, power supply from the commercial power source 12 to the low voltage power source section 13 is cut off, and electric charge charged in the smoothing electrolytic capacitor 23 is supplied to the power saving mode control section 28 of the load 14.

If the capacitor residual potential B<the threshold A, that is, if the capacitor residual potential is reduced, the above-described relay opening and closing signal 26 is changed to relay closing from relay opening even though the power saving mode shift signal 30 is input, and electric power from the commercial power source 12 is supplied to the load 14. Further, even if the capacitor residual potential B≥the threshold A, when the power saving mode shift signal 30 is stopped, the relay opening and closing signal 26 is changed to relay closing from relay opening, and electric power from the commercial power source 12 is supplied to the load 14.

This means that since the variety of load devices 27 of the load 14 are in an operation state and the power saving mode is stopped, electric power from the commercial power source 12 is supplied to the load devices 27. As described above, when the load 14 is in the power saving mode, electric power is supplied to the power saving mode control section 28 including the standby mode control section 28a or the sleep mode control section 28b from the smoothing electrolytic capacitor 23 not from the commercial power source 12, to cut off power supply from the commercial power source 12, thereby further enhancing power saving. Further, as the load in the power saving mode consumes less electric power by the power consumption reduction technique, a retention time in the electrolytic capacitor becomes long, thereby making it possible to reduce the number of charging times per hour.

Further, when the power saving mode shift signal 30 is input to the electrolytic capacitor residual potential monitoring circuit 24 from the power saving mode shift detecting section 29, the relationship between the smoothing electrolytic capacitor residual potential B and the threshold A becomes B<A, and when the electrolytic capacitor residual potential B is reduced, the relays are closed by the relay opening and closing signal 26. Thus, the commercial power source 12 is turned on, and electric power is supplied to the load 14 from the commercial power source 12. Further, at the same time, charging of the smoothing electrolytic capacitor 23 is started from the commercial power source 12.

Figure 3:
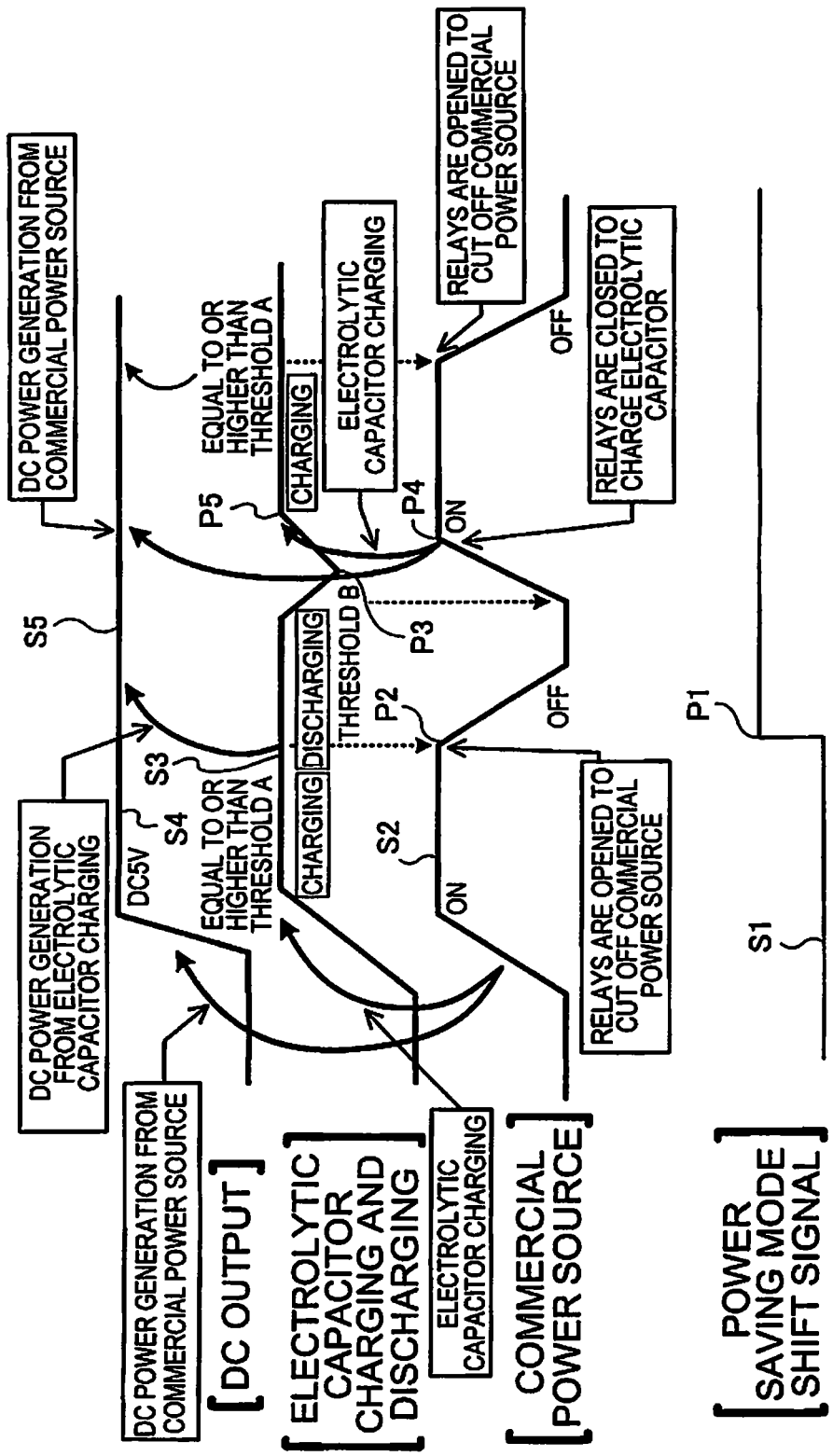
FIG. 3 is a sequence diagram illustrating the operation according to the embodiment.

In order to describe the embodiment in more detail, a sequence of the embodiment will be described with reference to FIG. 3. FIG. 3 illustrates a sequence of various voltages and signals, that is, a secondary output of DC 5 V of a transformer, charging and discharging of the electrolytic capacitor, the commercial power source, and the power saving mode shift signal, from the top.

When the power saving mode shift signal 30 is not output, that is, when the load 14 of the image forming apparatus 11 is not in the power saving mode (S1), the relays 20a and 20b are closed, and the commercial power source 12 is turned on (S2). At this time, the smoothing electrolytic capacitor 23 is charged to be equal to or higher than the threshold A (S3). Further, the secondary output of the transformer 25 outputs DC 5 V by power supply from the commercial power source 12 (S4).

If the load 14 is in the power saving mode and the power saving mode shift signal 30 is input to the electrolytic capacitor residual potential monitoring circuit 24 (P1), since the charged state of the electrolytic capacitor 23 is equal to or higher than the threshold A, the relays 20a and 20b are opened by the relay opening and closing signal 26 to thereby cut off power supply from the commercial power source 12 (P2). Even though power supply from the commercial power source 12 is cut off, power supply to the transformer 25 is continued by discharging (S4) of electric charge charged in the electrolytic capacitor 23 (S5).

When the electrolytic capacitor residual potential B is lower than the threshold B (P3), discharging from the smoothing electrolytic capacitor 23 is stopped, and the blocked commercial power source 12 is turned on (P4). Thus, until the smoothing electrolytic capacitor potential reaches the threshold A (P5), electric power is supplied to the load 14 from the commercial power source 12.

At the same time, charging of the smoothing electrolytic capacitor 23 is started from the commercial power source 12. Further, if the smoothing electrolytic capacitor potential becomes equal to or higher than the threshold A, as described above, the relays are opened so that the commercial power source 12 is cut off, and thus, electric power is supplied to the load 14 by discharging of electric charge charged in the smoothing electrolytic capacitor 23. This sequence is repeated while the power saving mode shift signal 30 is input to the electrolytic capacitor residual potential monitoring circuit 24 from the power saving mode shift detecting section 29 of the load 14.

When the capacitance of the smoothing electrolytic capacitor 23 is 6600 µF, the retention time of the electrolytic capacitor 23 is 183 seconds when the condition of the load is DC 5 V/0.04 A, and charging of 20 times per hour is performed in order to repeat the cycle. Further, the amount of electric power consumed for charging is 0.0136 Wh. As a result, the power consumption amount per hour is 0.0136 (Wh)×20 (times)=0.272 Wh.

Figure 4:
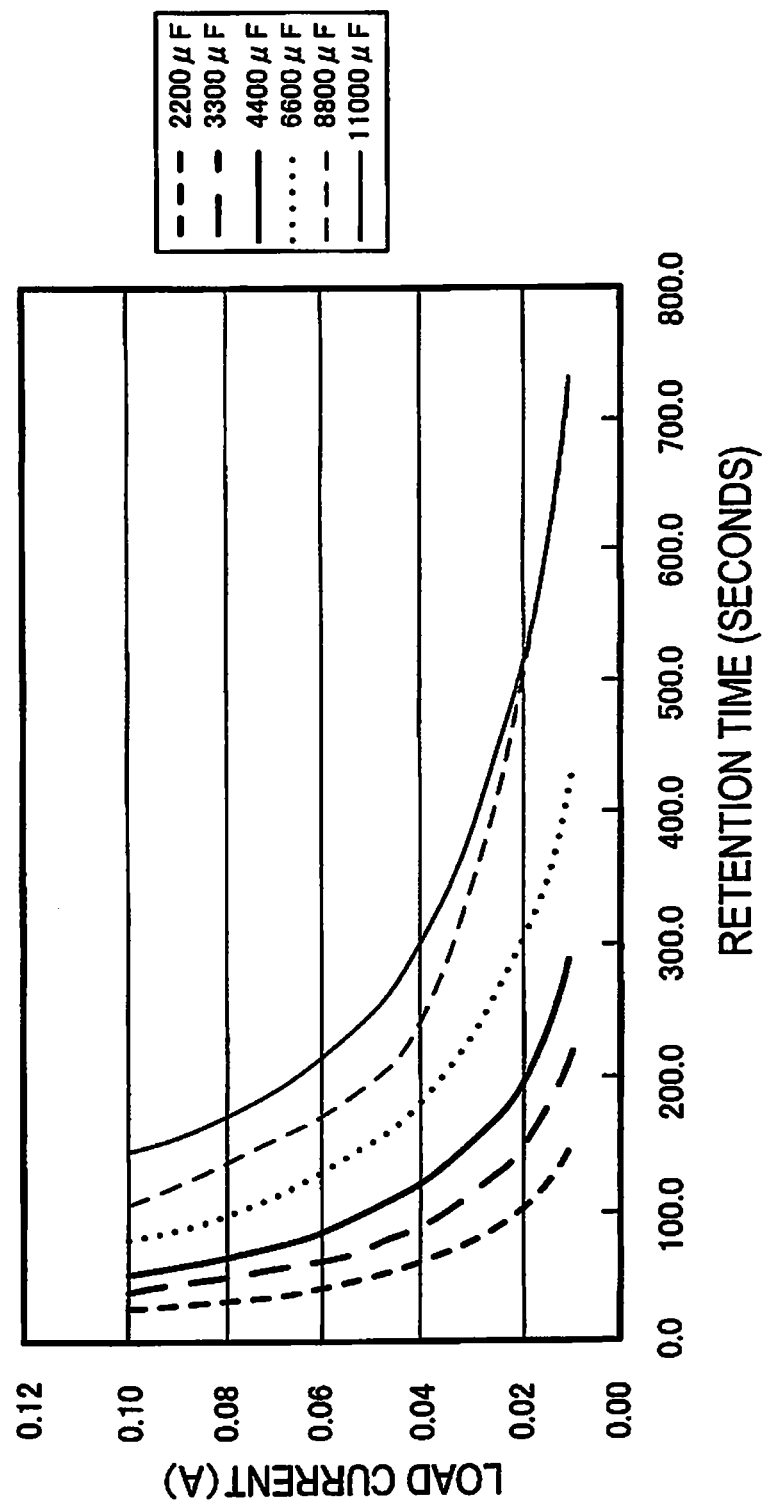
FIG. 4 is a diagram illustrating load current, which illustrates the operation according to the embodiment.

As a variety of smoothing electrolytic capacitors of different capacitances, the relationship between the retention time and the load current of each of 2200 µF, 3300 µF, 4400 µF, 6600 µF, 8800 µF and 11000 µF is illustrated in FIG. 4. As the variety of smoothing electrolytic capacitors, optimal electrolytic capacitors may be selected according to the power specification or the like of an image forming apparatus to be applied.

Further, when the smoothing electrolytic capacitors of four types of 2200 µF, 4400 µF and 6600 µF are employed as an example, full charging time (seconds) and power consumption amount (Wh) during full charging are shown. As shown in FIG. 5, the power consumption amount is changed according to the capacitance of the electrolytic capacitor, but the full charging time is uniformly 0.5 seconds for all the capacitors. As described above, the smoothing electrolytic capacitors may be optimally selected according to the variety of specifications of the image forming apparatus.

While certain embodiments have been described, these embodiments have been presented by way of example only, and are not and are not intended to limit the scope of the inventions. Indeed, the novel devices and methods described herein may be embodied in a variety of other forms: furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. An image forming apparatus which converts an AC voltage from a commercial power source into a DC voltage through a rectifying circuit and an electric storage device and supplies the DC voltage to a load through a transformer,
   wherein a relay is installed between the commercial power source and the rectifying circuit;
   the electric storage device is capable of charging and discharging, and an electric storage device residual potential monitoring circuit is connected to an output terminal of the electric storage device;
   the load comprises a load device, a power saving mode control section, and a power saving mode shift detecting section which detects that the load shifts to a power saving mode and outputs a power saving mode shift signal; and
   if the power saving mode shift signal is input to the electric storage device residual potential monitoring circuit, a relay opening and closing signal for instructing opening and closing of the relay is output from the electric storage device residual potential monitoring circuit, the relay is opened to cut off the supply of the commercial power source, and electric charge charged in the electric storage device is supplied to the power saving mode control section.

2. The apparatus according to claim 1,
   wherein the electric storage device is an electrolytic capacitor.

3. The apparatus according to claim 2,
   wherein the electrolytic capacitor is an aluminum electrolytic capacitor.

4. The apparatus according to claim 2,
   wherein a threshold is set by the electric storage device residual potential monitoring circuit; a residual potential of the electric storage device is compared with the threshold; and if the residual potential of the electric storage device is lower than the threshold, the relay opening and closing signal is output and the relay is closed to charge the electric storage device by the commercial power source,
   wherein, if the residual potential of the electric storage device is equal to or higher than the threshold, the relay opening and closing signal is output and the relay is opened to supply the electric charge charged in the electric storage device to the power saving mode control section.

5. The apparatus according to claim 2,
wherein the electric storage device residual potential monitoring circuit outputs the relay opening and closing signal to repeat charging and discharging of the electric storage device.

6. The apparatus according to claim
wherein the electric storage device is an electric double layer capacitor.

7. The apparatus according to claim 6,
wherein a threshold is set by the electric storage device residual potential monitoring circuit; a residual potential of the electric storage device is compared with the threshold; and if the residual potential of the electric storage device is lower than the threshold, the relay opening and closing signal is output and the relay is closed to charge the electric storage device by the commercial power source,
wherein, if the residual potential of the electric storage device is equal to or higher than the threshold, the relay opening and closing signal is output and the relay is opened to supply the electric charge charged in the electric storage device to the power saving mode control section.

8. The apparatus according to claim 1,
wherein the electric storage device residual potential monitoring circuit outputs the relay opening and closing signal to repeat charging and discharging of the electric storage device.

9. The apparatus according to claim 8,
wherein the repetition of the charging and discharging of the electric storage device is continued while the power saving mode shift signal is being input to the electric storage device residual potential monitoring circuit.

10. The apparatus according to claim 1,
wherein if the power saving mode shift signal is not input to the electric storage device residual potential monitoring circuit, the relay is dosed by the relay opening and closing signal.

11. An image forming apparatus which converts an AC voltage from a commercial power source into a DC voltage through a rectifying circuit and an electric storage device and supplies the DC voltage to a load through a transformer,
wherein a relay is installed between the commercial power source and the rectifying circuit;
the electric storage device is capable of charging and discharging, and an electric storage device residual potential monitoring circuit is connected to an output terminal of the electric storage device;
the load comprises a load device, a power saving mode control section, and a power saving mode shift detecting section which detects that the load shifts to a power saving mode and outputs a power saving mode shift signal;
the power saving mode control section comprises standby mode control section and a sleep mode control section; and
if the power saving mode shift signal is input to the electric storage device residual potential monitoring circuit, a relay opening and closing signal for instructing opening and closing of the relay is output from the electric storage device residual potential monitoring circuit, the relay is opened to cut off the supply of the commercial power source, and electric charge charged in the electric storage device is supplied to the power saving mode control section.

12. The apparatus according to claim 11,
wherein a threshold is set by the electric storage device residual potential monitoring circuit; a residual potential of the electric storage device is compared with the threshold; and if the residual potential of the electric storage device is lower than the threshold, the relay opening and closing signal is output and the relay is closed to charge the electric storage device by the commercial power source,
wherein, if the residual potential of the electric storage device is equal to or higher than the threshold, the relay opening and closing signal is output and the relay is opened to supply the electric charge charged in the electric storage device to the power saving mode control section.

13. The apparatus according to claim 11,
wherein the electric storage device residual potential monitoring circuit outputs the relay opening and closing signal to repeat charging and discharging of the electric storage device.

14. The apparatus according to claim 13,
wherein the repetition of the charging and discharging of the electric storage device is continued while the power saving mode shift signal is being input to the electric storage device residual potential monitoring circuit.

15. The apparatus according to claim 11,
wherein if the power saving mode shift signal is not input to the electric storage device residual potential monitoring circuit, the relay is closed by the relay opening and closing signal.

16. An image forming apparatus which converts an AC voltage from a commercial power source into a DC voltage through a rectifying circuit and an electric storage device and supplies the DC voltage to a load through a transformer,
wherein a relay is installed between the commercial power source and the rectifying circuit;
the electric storage device is capable of charging and discharging, and an electric storage device residual potential monitoring circuit is connected to an output terminal of the electric storage device;
the load comprises a load device, a power saving mode control section, and a power saving mode shift detecting section which detects that the load shifts to a power saving mode and outputs a power saving mode shift signal; and
if the power saving mode shift signal is input to the electric storage device residual potential monitoring circuit, a relay opening and closing signal for instructing opening and closing of the relay is output from the electric storage device residual potential monitoring circuit, the relay is opened to cut off the supply of the commercial power source, and electric charge charged in the electric storage device is supplied to the power saving mode control section,
wherein a threshold is set by the electric storage device residual potential monitoring circuit; a residual potential of the electric storage device is compared with the threshold; and if the residual potential of the electric storage device is lower than the threshold, the relay opening and closing signal is output and the relay is closed to charge the electric storage device by the commercial power source.

17. The apparatus according to claim 16,
wherein if the residual potential of the electric storage device is equal to or higher than the threshold, the relay opening and closing signal is output and the relay is opened to supply the electric charge charged in the electric storage device to the power saving mode control section.

18. The apparatus according to claim 16,
wherein the electric storage device residual potential monitoring circuit outputs the relay opening and closing signal to repeat charging and discharging of the electric storage device.

19. The apparatus according to claim 18,
wherein the repetition of the charging and discharging of the electric storage device is continued while the power saving mode shift signal is being input to the electric storage device residual potential monitoring circuit.

20. The apparatus according to claim 16,
wherein the power saving mode control section comprises a standby mode control section and a sleep mode control section.

* * * * *